428-408
5/26/81 XR 4,269,892 SR

United States Patent [19] [11] 4,269,892
Shattuck et al. [45] May 26, 1981

[54] POLYESTER RIBBON FOR NON-IMPACT PRINTING

[75] Inventors: Meredith D. Shattuck, San Jose; William J. Weiche, Los Gatos, both of Calif.

[73] Assignee: International Business Machines Corporation, Armonk, N.Y.

[21] Appl. No.: 118,161

[22] Filed: Feb. 4, 1980

[51] Int. Cl.[3] .......................... B32B 9/04; B41J 31/00

[52] U.S. Cl. .................................... 428/337; 101/467; 400/118; 400/119; 400/120; 400/241.1; 400/241.4; 428/323; 428/408; 428/480; 428/484; 428/913; 428/914; 428/411; 428/688

[58] Field of Search ............ 400/118, 119, 120, 241.1, 400/241.2, 241.3, 241.4; 101/467; 428/408, 484, 480, 337, 336, 335, 323, 922, 913, 914, 538, 411

[56] References Cited

U.S. PATENT DOCUMENTS

| | | | |
|---|---|---|---|
| 2,713,822 | 7/1955 | Newman | 101/467 |
| 3,570,380 | 3/1971 | Kamenstein | 346/76 L |
| 3,744,611 | 7/1973 | Montanari | 346/76 |
| 3,865,626 | 2/1975 | Diener | 428/408 |
| 4,103,066 | 7/1978 | Brooks | 428/337 |
| 4,158,715 | 6/1979 | Smith | 428/480 |
| 4,189,514 | 2/1980 | Johnson | 428/922 |

FOREIGN PATENT DOCUMENTS

| | | | |
|---|---|---|---|
| 692229 | 8/1964 | Canada | 480/241.1 |

OTHER PUBLICATIONS

"Thermal Printer Ribbons", W. Crooks, *IBM Tech. Discl. Bulletin*, vol. 18, No. 7, Dec. 1975.

*Primary Examiner*—Ellis P. Robinson
*Attorney, Agent, or Firm*—Joseph G. Walsh

[57] ABSTRACT

The present invention is concerned with a ribbon for non-impact printing. The ribbon comprises a transfer coating and a substrate which is a polyester resin containing from about 15% to about 40% by weight of electrically conductive carbon black.

10 Claims, No Drawings

POLYESTER RIBBON FOR NON-IMPACT PRINTING

DESCRIPTION

Technical Field

The present invention is concerned with a ribbon for use in non-impact printing. In particular, it is concerned with a resistive ribbon for use in a process in which printing is achieved by transfering ink from a ribbon to paper by means of local heating of the ribbon. Localized heating may be obtained, for example, by contacting the ribbon with point electrodes and a broad area contact electrode. The high current densities in the neighborhood of the point electrodes during an applied voltage pulse produce intense local heating which causes transfer of ink from the ribbon to a paper in contact with the ribbon.

Background Art

Non-impact printing is known in the prior art as shown, for example, in U.S. Pat. Nos. 2,713,822 and 3,744,611.

A polycarbonate resin containing conductive carbon black is use as a substrate for a resistive ribbon for thermal transfer printing in U.S. Pat. No. 4,103,066.

SUMMARY OF THE INVENTION

The present invention is concerned with a ribbon for use in non-impact printing. In addition to a transfer coating, the ribbon comprises a substrate which contains a polyester resin containing from about 15% to about 40% by weight of electrically conductive carbon black.

The polycarbonate substrate described in the above-mentioned U.S. Pat. No. 4,103,066 has given excellent results. Polycarbonate ribbons, despite having high tensile strength, have the drawback of being quite brittle, and tending to break. A typical polycarbonate ribbon has an elongation of only about 1%. This drawback results in difficulty in handling the ribbon during machine use. The polyesters of the present invention overcome this drawback and also provide excellent printing results.

It has been proven to be extremely difficult to find materials useful for making ribbons for thermal non-impact printing. The difficulty is that the substrate material must simultaneously possess several different properties seldom found together. The polyester ribbon of the present invention possesses all the desired attributes. The ribbon results in very good printing and is relatively easy to handle without breaking.

According to the present invention, the substrate is a polyester resin containing dispersed therein from about 15% to about 40% by weight of electrically conductive carbon black. About 30% by weight is preferred.

Many polyester resins are known to the art and are commercially available. As examples of useful materials there may be mentioned the Vitel polyesters. Vitel is a trademark of Goodyear Tire and Rubber Company for a class of polyesters which are linear saturated resins containing few free hydroxyl units. Examples of such materials are PE207, PE222 and VPE4583A. Mylar adhesive 49000 is another polyester which has given good results when used in the present invention. Mylar 49000 is a Trademark of Du Pont for polyester. A preferred material is Estane 5707-FI, a polyester which has been cross-linked with isocyanate. Estane is the trademark of the B. F. Goodrich Company.

Carbon black is available from numerous commercial sources. For the present invention, furnace blacks are preferred since they are more electrically conductive than channel blacks. The typical commercially available conductive carbon black has a very small particle size on the order of about 250 A.

The substrate layer of the ribbons of the present invention are preferably from about 8 microns to about 35 microns in thickness. Best results are obtained at about 15 to 20 microns.

In one particularly desirable variation of the present invention, the polyester resin is treated with an isocyanate cross-linking agent. During the cross-linking the isocyanate reacts with the polyester resin at reactive sites located in the resin molecule. Most generally, such reactive sites are reactive hydrogen atoms, for example, hydrogen atoms contained in the hydroxyl groups of the alcohol or in the carboxylic acid groups of the acid used to make the polyester. Cross-linking isocyanate materials are known in the art and are commercially available. Among such materials, there may be mentioned Mondur CB-60, which is a registered trademark of Mobay Chemical Corporation for an aromatic polyisocyanate adduct. The material is 60% solids dissolved in ethyl glycol acetate and xylene. Another preferred isocyanate is PAPI, a registered trademark of the Upjohn Company for poly[methylene(polyphenyl isocyanate)].

Treating of the polyester resin with the polyisocyanate cross-linking agent improves the heat resistance of the polyester substrate when it is used in thermal non-impact printing. It also has still an additional advantage in that it promotes adhesion of the polyester substrate layer when it is used in conjunction with other layers.

The polyester resins of the present invention may be used to form substrates where they have been mixed with lesser amounts of compatible resins, for example, with polycarbonates and/or polyethers. When polyester forms the major component of the mixture, the desired mechanical handling properties are obtained.

The substrate of the present invention is used in conjunction with a transfer coating for non-impact printing. Many such transfer coatings are known to the prior art. The coating usually comprises a wax or a thermoplastic resin, carbon black pigment, and perhaps a dye. The transfer coating is generally from about 1 to about 5 microns thick. The polyester substrates of the present invention may be used with any conventional transfer coating.

In addition to the transfer coating and the substrate, non-impact thermal transfer printing sometimes uses ribbons containing additional layers, for example, an additional electrically conductive layer or an additional layer to serve as a backing. The polyester substrate of the present invention is suitable for use in such multilayer structures.

The following Examples are given solely for purposes of illustration and are not to be considered a limitation on the invention, many variations of which are possible without departing from the spirit and scope thereof.

PREFERRED EMBODIMENTS

Example I 7.75 parts Vitel PE207 (Goodyear Chemical) were added to 2.25 parts Vitel PE222 in dichloromethane. Carbon XC72, an electrically conductive carbon from Cabot Corporation, was added to the polyester solution at a level of 30% carbon based on the total carbon polymer mix. After mixing to disperse the carbon, the slurry was coated on a polyethylene substrate.

The polyester coating was subsequently metallized with 1000 A of aluminum and was delaminated from the polyethylene.

The resistive layer was brought in contact with thermochromic paper and was used to print on the thermal paper. Excellent print was obtained.

The layer had the following properties:

| | |
|---|---|
| Tensile Strength | ~1900 psi |
| Elongation | ~40% |
| Modulus | ~8 × $10^5$ psi |

Example II

Another polyester combination of 25 parts PE222 with 75 parts PE207 and 30% carbon XC-72 was combined with 10% Mondur CB-60, a polydiisocyanate. The film was mixed and coated from toluene as in Example I, and was heated to cure overnight in a steam cabinet.

The film was found to have the following properties:

| | |
|---|---|
| Tensile Strength | ~4200 psi |
| Elongation | ~120% |
| Modulus | ~2.1 × $10^5$ psi |

Example III

A polyester PE207 was combined with 40% CB-60 polydiisocyanate (40% based on polyester). The ribbon also contained a 30% carbon load. The ribbon was heated to cure overnight in a steam cabinet.

The ribbon properties were:

| | |
|---|---|
| Tensile Strength | ~5600 psi |
| Elongation | ~35% |
| Modulus | ~5.6 × $10^5$ psi |

Example IV

A 50/50 ratio of PE207 with PE222 was used. Polydiisocyanate CB-60 was added at a level of 20%. The carbon load was 30%.

The ribbon properties were:

| | |
|---|---|
| Tensile Strength | ~4800 psi |
| Elongation | ~110% |
| Modulus | ~3.2 × $10^5$ psi |

Example V 7.5 parts of Estane 57707-F1 (Goodrich Corp.) was mixed with 2.5 parts of Vitel PE222 (Goodyear Corp.) and dissolved in tetrahydrofuran. XC-72 carbon (Cabot Corp.) was added at a 30% level based on the resin-carbon total and dispersed. To this was added (based on polymer total) 10% poly[methylene(polyphenyl isocyanate)], known commercially as PAPI, which is a cross-linking agent.

The mixture was coated onto polyethylene film and dried. The layer was then delaminated from the polyethylene and the physical properties were:

| | |
|---|---|
| Tensile Strength | = 4800 psi |
| Elongation | = 95% |
| Modulus | = 1.5 × $10^5$ psi |

Example VI 7.5 parts of VPE 4583 A was mixed with 2.5 parts of PE222 and dissolved in $CH_2Cl_2$. To this was added 32% of XC-72 carbon and the mix was dispersed. 7.5% of PAPI (based on polymer wt) was added and mixed. The dispersion was then coated onto polyethylene, dried and delaminated.

Physical properties were:

| | |
|---|---|
| Tensile | ~3400 psi |
| Elongation | = 40% |
| Modulus | = 4.3 × $10^5$ psi |

Example XII 10 parts of Mylar adhesive 49000 (a Du Pont Corp. polyester) was dissolved in tetrahydrofuran. Added to this solution and dispersed therein was 30% XC-72 carbon (based on wt of polymer). To this Mondur CB-60 was added at a 5% loading (based on polymer wt.).

Physical properties were:

| | |
|---|---|
| Tensile | = 3900 psi |
| Elongation | = 5% |
| Modulus | = 4 × $10^5$ psi |

We claim:

1. A ribbon for non-impact thermal transfer printing comprising a transfer layer and a substrate comprising a polyester resin containing from about 15% to about 40% by weight of electrically conductive carbon black.

2. A ribbon as claimed in claim 1 wherein carbon black is present at about 30% by weight.

3. A ribbon as claimed in claim 1 wherein the substrate is from about 5 to about 35 microns in thickness.

4. A ribbon as claimed in claim 1 wherein the substrate is about 15 microns thick.

5. A ribbon as claimed in claim 1 wherein the transfer layer comprises wax or a thermoplastic resin, and carbon black or a dye.

6. A ribbon for non-impact thermal printing comprising a transfer layer and a substrate which comprises polyester resin which has been cross-linked by reaction with an isocyanate, and which contain from about 15% to about 40% by weight of electrically conductive carbon black.

7. A ribbon as claimed in claim 6 wherein carbon black is present at about 30% by weight.

8. A ribbon as claimed in claim 6 wherein the substrate is from about 5 to about 35 microns in thickness.

9. A ribbon as claimed in claim 6 wherein the substrate is about 15 microns thick.

10. A ribbon as claimed in claim 6 wherein the transfer layer comprises wax or a thermoplastic resin, and carbon black or a dye.

* * * * *